United States Patent
Ellis et al.

(10) Patent No.: US 12,461,830 B2
(45) Date of Patent: Nov. 4, 2025

(54) RESOURCE-AWARE WORKLOAD REALLOCATION ACROSS CLOUD ENVIRONMENTS

(71) Applicant: INTERNATIONAL BUSINESS MACHINES CORPORATION, Armonk, NY (US)

(72) Inventors: Marquita May Ellis, White Plains, NY (US); Abhishek Malvankar, White Plains, NY (US); Alaa S. Youssef, Valhalla, NY (US)

(73) Assignee: International Business Machines Corporation, Armonk, NY (US)

( * ) Notice: Subject to any disclaimer, the term of this patent is extended or adjusted under 35 U.S.C. 154(b) by 22 days.

(21) Appl. No.: 18/644,005

(22) Filed: Apr. 23, 2024

(65) Prior Publication Data

US 2025/0328436 A1 Oct. 23, 2025

(51) Int. Cl.
*G06F 11/20* (2006.01)
*G06F 9/48* (2006.01)
*G06F 9/50* (2006.01)

(52) U.S. Cl.
CPC .......... *G06F 11/203* (2013.01); *G06F 9/4856* (2013.01); *G06F 9/4887* (2013.01); *G06F 9/5027* (2013.01); *G06F 9/5072* (2013.01)

(58) Field of Classification Search
CPC .... G06F 11/203; G06F 9/4856; G06F 9/4887; G06F 9/5027; G06F 9/5072
See application file for complete search history.

(56) References Cited

U.S. PATENT DOCUMENTS

| | | |
|---|---|---|
| 7,734,778 B2 | 6/2010 | Tsao |
| 8,095,929 B1 | 1/2012 | Ji et al. |
| 8,239,518 B2 | 8/2012 | Wipfel et al. |
| 8,601,471 B2 | 12/2013 | Beaty et al. |
| 8,639,793 B2 | 1/2014 | Kapur et al. |

(Continued)

OTHER PUBLICATIONS

Li, Yawei, et al. "Fault-aware runtime strategies for high-performance computing." IEEE Transactions on Parallel and Distributed Systems 20.4 (2008): 460-473.

(Continued)

*Primary Examiner* — Bryce P Bonzo
*Assistant Examiner* — Mathew Donald Gustafson
(74) *Attorney, Agent, or Firm* — CHIP LAW GROUP

(57) ABSTRACT

A computer hardware system includes a context controller configured to manage recovery for a workload within a cloud environment. A plurality of compute nodes are initially allocated to the workload, as a current allocation, within a context of the cloud environment. A failure within the current allocation is identified. Responsive to the failure being identified, a plurality of costs respectively associated with each of a plurality of recovery options for the workload are evaluated. A lowest-cost option, from the plurality of recovery options being evaluated, is executed. The recovery options being evaluated includes both recovery options that include performing the workload within the current context and recovery options that include performing at least a portion of the workload in at least one secondary context of the cloud environment. A resource controller node associated with the context controller is communicated with to identify the at least one secondary context.

20 Claims, 9 Drawing Sheets

(56) References Cited

U.S. PATENT DOCUMENTS

| | | |
|---|---|---|
| 10,135,751 B2 | 11/2018 | Bryant et al. |
| 11,182,718 B2 | 11/2021 | Palavalli et al. |
| 2003/0191838 A1 | 10/2003 | Tsao |
| 2005/0268154 A1 | 12/2005 | Wipfel et al. |
| 2008/0222638 A1 | 9/2008 | Beaty et al. |
| 2009/0199175 A1 | 8/2009 | Keller et al. |
| 2012/0054332 A1 | 3/2012 | Sahu et al. |
| 2012/0110186 A1 | 5/2012 | Kapur et al. |
| 2016/0323373 A1 | 11/2016 | Bryant et al. |
| 2017/0099203 A1* | 4/2017 | Shapur ................ H04L 67/1034 |
| 2019/0370134 A1* | 12/2019 | Salapura ............. G06F 11/2048 |
| 2020/0234211 A1 | 7/2020 | Palavalli et al. |
| 2024/0103923 A1* | 3/2024 | Regge .................. G06F 9/5038 |

OTHER PUBLICATIONS

Zhang, Zhuo, et al. "Fuxi: a fault-tolerant resource management and job scheduling system at internet scale." Proceedings of the VLDB Endowment. vol. 7. No. 13. VLDB Endowment Inc., 2014.

Li, Zhongjin, et al. "Real-time and dynamic fault-tolerant scheduling for scientific workflows in clouds." Information Sciences 568 (2021): 13-39.

Kraemer, Alessandro, et al. "Reducing the number of response time service level objective violations by a cloud-HPC convergence scheduler." Concurrency and Computation: Practice and Experience 30.12 (2018): e4352, 15 pg.

Mukwevho, Mukosi Abraham, and Turgay Celik. "Toward a smart cloud: A review of fault-tolerance methods in cloud systems." IEEE Transactions on Services Computing 14.2 (2018): 589-605.

Chandrashekar, Deepak Poola. Robust and fault-tolerant scheduling for scientific workflows in cloud computing environments. Diss. University of Melbourne, Department of Computing and Information Systems, 2015, 192 Pg.

Gill, Sukhpal Singh, and Rajkumar Buyya. "Failure management for reliable cloud computing: a taxonomy, model, and future directions." Computing in Science & Engineering 22.3 (2018): 52-63.

Yan, Hui, et al. "DEFT: Dynamic fault-tolerant elastic scheduling for tasks with uncertain runtime in cloud." Information Sciences 477 (2019): 30-46 [Abstract].

Mell, P. et al., The NIST Definition of Cloud Computing, National Institute of Standards and Technology, U.S. Dept. of Commerce, Special Publication 800-145, Sep. 2011, 7 pg.

* cited by examiner

RESOURCE-AWARE WORKLOAD REALLOCATION ACROSS CLOUD ENVIRONMENTS

BACKGROUND

The present invention relates to cloud environments, and more specifically, to workload reassignment in cloud environments using a controller-driven graph search.

Large scale, high performance computing (HPC), e.g., artificial intelligence (AI) applications, frequent leverage dynamic computer systems such as the cloud. In short, the "cloud" refers to on-demand computing services that typically include resources such as data storage and computer processing. The term "cloud," as used herein, can include a number of distributed hardware, middleware, and software components that are used to provide these computing services and extends to edge, sky computing systems, fully private clouds, as well as typical variants. These typical variants include a fully public cloud, a hybrid cloud (i.e., including both public and private components) as well as multi-cloud, which includes multiple different clouds.

As with all computer systems, the cloud is subject to failure at any number of different failure points, such as hardware, middleware, and the software components. The frequency of encountering a failure can be particularly high in HPC and AI applications due to their large and specialized resource requirements and performance demands. Current approaches allow for the recovery of workloads being performed in a particular cloud context. However, there is a need for an improved approach to determining how and where to recovery workloads in a complex cloud environment.

SUMMARY

A method is performed by a computer hardware system including a context controller for managing recovery for a workload within a cloud environment. A plurality of compute nodes are initially allocated to the workload, as a current allocation, within a context of the cloud environment. A failure within the current allocation is identified. Responsive to the failure being identified, a plurality of costs respectively associated with each of a plurality of recovery options for the workload are evaluated. A lowest-cost option, from the plurality of recovery options being evaluated, is executed. The recovery options being evaluated includes both recovery options that include performing the workload within the current context and recovery options that include performing at least a portion of the workload in at least one secondary context of the cloud environment. A resource controller node associated with the context controller is communicated with to identify the at least one secondary context.

Additionally, the recovery options being evaluated include: a recovery option that shrinks the workload to be performed in the current context, a recovery option that shifts the current allocation to a new allocation in the current context, a recovery option that re-queues the workload in the current context within a deadline, a recovery option that performs a portion of the workload in the current context and bursts a different portion of the workload into the at least one secondary context, and a recovery option that reassigns the workload to the at least one secondary context. For each of the recovery options a determination is first made whether the recovery option is capable of being performed, and for a particular recovery options determined to be incapable of being performed, an evaluation of a cost for performing that particular option is not performed. The context controller is configured to: determine capacities, respectively, for each of a plurality of contexts being managed by the context controller, and provide the capacities to the resource controller node.

A computer hardware system is configured to execute a context controller for managing recovery for a workload within a cloud environment. The computer hardware system includes a hardware processor configured to initiate the following operations. A plurality of compute nodes are initially allocated to the workload, as a current allocation, within a context of the cloud environment. A failure within the current allocation is identified. Responsive to the failure being identified, a plurality of costs respectively associated with each of a plurality of recovery options for the workload are evaluated. A lowest-cost option, from the plurality of recovery options being evaluated, is executed. The recovery options being evaluated includes both recovery options that include performing the workload within the current context and recovery options that include performing at least a portion of the workload in at least one secondary context of the cloud environment. A resource controller node associated with the context controller is communicated with to identify the at least one secondary context.

Additionally, the recovery options being evaluated include: a recovery option that shrinks the workload to be performed in the current context, a recovery option that shifts the current allocation to a new allocation in the current context, a recovery option that re-queues the workload in the current context within a deadline, a recovery option that performs a portion of the workload in the current context and bursts a different portion of the workload into the at least one secondary context, and a recovery option that reassigns the workload to the at least one secondary context. For each of the recovery options a determination is first made whether the recovery option is capable of being performed, and for a particular recovery options determined to be incapable of being performed, an evaluation of a cost for performing that particular option is not performed. The context controller is configured to: determine capacities, respectively, for each of a plurality of contexts being managed by the context controller, and provide the capacities to the resource controller node.

A computer program product comprises a computer readable storage medium having stored therein program code. The program code, which when executed by a computer hardware system including a context controller for managing recovery for a workload within a cloud environment workload allocation engine, causes the computer hardware system to perform the following. A plurality of compute nodes are initially allocated to the workload, as a current allocation, within a context of the cloud environment. A failure within the current allocation is identified. Responsive to the failure being identified, a plurality of costs respectively associated with each of a plurality of recovery options for the workload are evaluated. A lowest-cost option, from the plurality of recovery options being evaluated, is executed. The recovery options being evaluated includes both recovery options that include performing the workload within the current context and recovery options that include performing at least a portion of the workload in at least one secondary context of the cloud environment. A resource controller node associated with the context controller is communicated with to identify the at least one secondary context.

Additionally, the recovery options being evaluated include: a recovery option that shrinks the workload to be performed in the current context, a recovery option that shifts the current allocation to a new allocation in the current context, a recovery option that re-queues the workload in the current context within a deadline, a recovery option that performs a portion of the workload in the current context and bursts a different portion of the workload into the at least one secondary context, and a recovery option that reassigns the workload to the at least one secondary context. For each of the recovery options a determination is first made whether the recovery option is capable of being performed, and for a particular recovery options determined to be incapable of being performed, an evaluation of a cost for performing that particular option is not performed. The context controller is configured to: determine capacities, respectively, for each of a plurality of contexts being managed by the context controller, and provide the capacities to the resource controller node.

This Summary section is provided merely to introduce certain concepts and not to identify any key or essential features of the claimed subject matter. Other features of the inventive arrangements will be apparent from the accompanying drawings and from the following detailed description.

DETAILED DESCRIPTION

Figure 1:
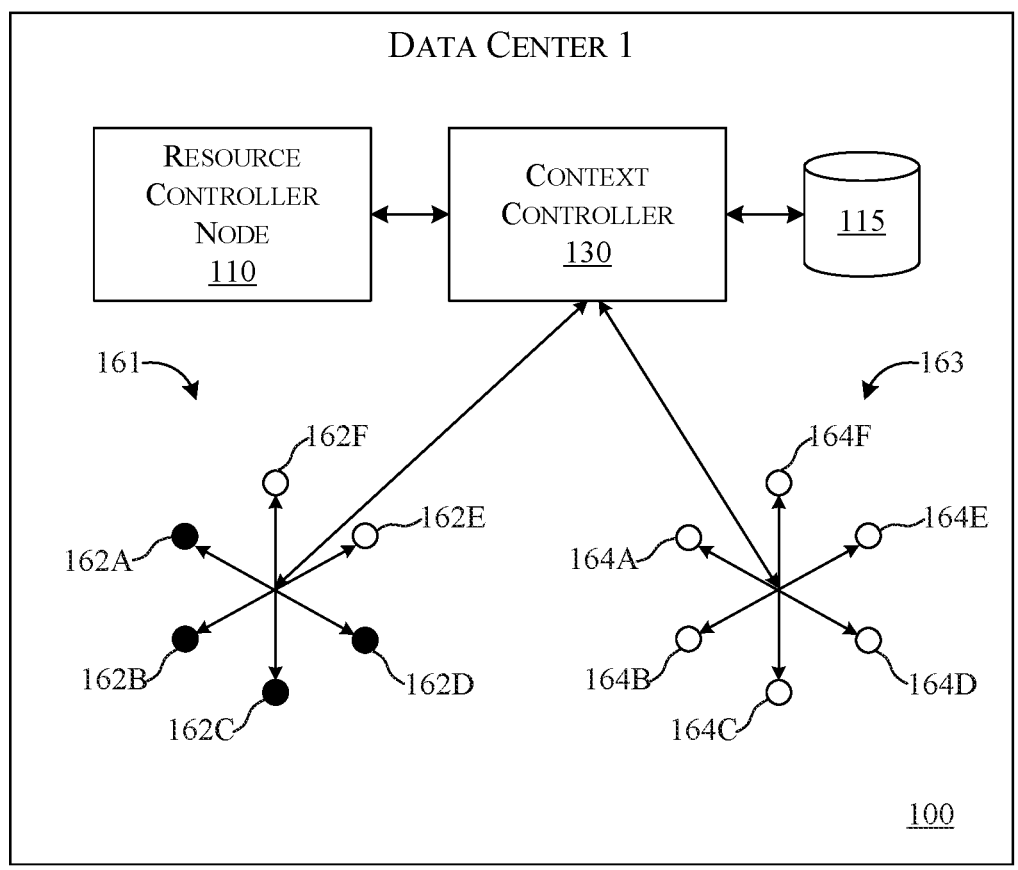
FIG. 1 is a block diagram illustrating an example architecture of a data center and a context controller according to an embodiment of the present invention.

FIG. 1 illustrates an exemplary data center environment (e.g., data center 100) within a cloud environment and a context controller 130 used to manage recovery for a workload within the cloud environment. A plurality of compute nodes 162A-D are initially allocated to the workload, as a current allocation, within a context 161 of the cloud environment. A failure within the current allocation is identified, and responsive to the failure being identified (e.g., compute node 162D), a plurality of costs respectively associated with each of a plurality of recovery options for the workload are evaluated. A lowest-cost option, from the plurality of recovery options being evaluated, is then selected to be executed. The recovery options being evaluated includes both recovery options that include performing the workload within the current context 161 and recovery options that include performing at least a portion of the workload in at least one secondary context 163 of the cloud environment. A resource controller node 110 associated with the context controller 130 is communicated with to identify the at least one secondary context 163.

As used herein, the term "workload" is defined as a runnable and recoverable application instance. Consequently, the workload can include, for example, code, dependencies, data, parameter set selection, and an implicit or explicit recovery procedure. A workload typically also has associated requirements and processing demands (e.g., hardware and software). These requirements may include the use of multiple compute nodes or gangs in a distributed system. Additionally, the workload may be associated with additional requirements such as service level agreements (SLA), service level objectives (SLO), and data regulations among others. The recovery procedure for a particular workload may define a recovery or restart state and also determine what mechanisms are needed for recovery. For example, distributed training can be used to recover from a model checkpoint. Additionally, access to the location storing the input data and output checkpoints can be part of the workload requirements. Many types of recovery techniques are known, and the present context controller 130 and/or resource controller node 110 is not limited as to a particular recovery technique.

As used herein, the term "context" is defined as a computing environment that include of between 1 and N compute nodes with each node including networking hardware/software that is configured to enable communication within and between the compute nodes. Additionally, the compute nodes are connected and configured such that any subgroup of the N compute nodes can process a workload requiring N or fewer compute nodes. The compute nodes in a context are not limited to a particular configuration. For example, the compute nodes can be found within an on premise system (e.g., private network), the cloud, a hybrid cloud, a multi-cloud, or any other configuration that includes one or more computer nodes. For example, compute nodes can include edge devices and/or Internet of Things (IoT) devices so long as the compute nodes are configured to support the requirements of the workload. Additionally, the compute nodes need not be physical devices (e.g., bare metal) but can also include virtual machines, container orchestration system, and similar systems.

As used herein, the term "allocation" or "current allocation" is defined as those compute nodes, within a particular context, that are currently assigned to a workload. An allocation of compute nodes, however, is not necessarily exclusive to the workload as one or more of the compute nodes can also be assigned to other workloads.

As used herein, the term "deadline" is defined as a statically- or dynamically-determined time threshold or cut-off for a workload to be performed.

Figure 2:
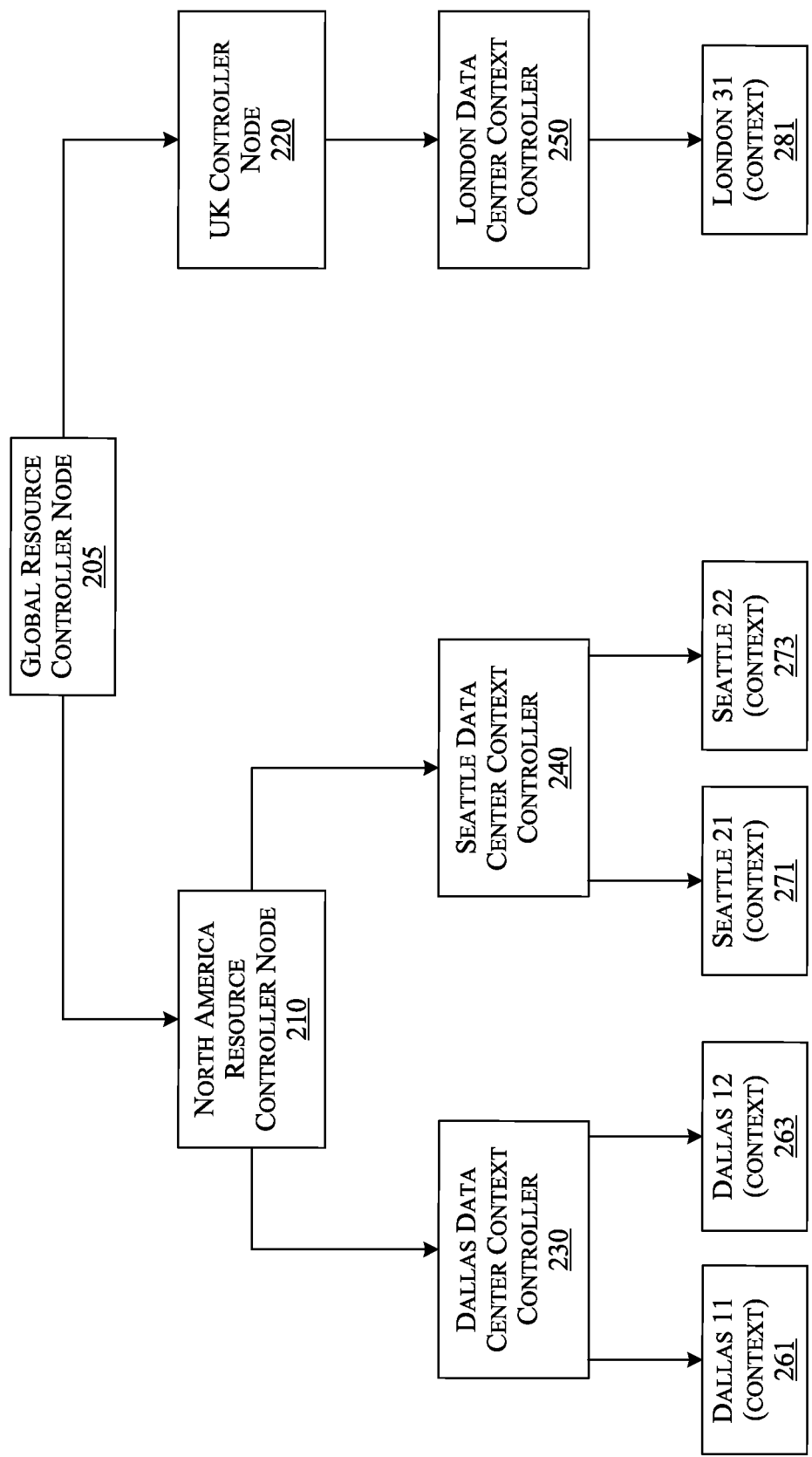
FIG. 2 is a controller graph for use with the context controller of FIG. 1 according to an embodiment of the present invention.

Reference is made to FIG. 2, which illustrates a controller graph 200 for use with the center controller 130 of FIG. 1 (also illustrated in FIG. 2 as context controllers 230-250).

The controller graph 200 graphically illustrates a tree structure comprised of controllers 205-250 and contexts 261-269. As discussed above, each of the contexts 261-269 is a computer environment that includes between 1 and N compute nodes. Although not limited in this manner (e.g., the nodes for a particular context can span different physical data centers), as illustrated, each of the contexts 261-269 are illustrated as being associated with a particular data center (e.g., Dallas data center, Seattle data center, London data center). Each of the contexts 261-269 are managed by a particular context controller 230-250. Additionally, although the context controllers 230-250 and the resource controller nodes 205-220 are illustrated as being separate, one or more functions of each can be combined into a singular instance. For example, the North America resource controller node 210 (i.e., as a resource controller node) can be physically located with the Dallas data center content controller instance 230. Although the controller graph 200 is illustrated as a 2-level graph, the controller graph 200 is not limited in this manner.

The context controllers 230-250 are configured to dynamically (i.e., in real-time) determine a particular context's processing capability. For example, if the nodes of a particular context (e.g., context 261) are allocated to a new workload, the capacity of that particular context (e.g., context 261) is reduced. Conversely, if the same particular context (e.g., context 261) has completed a workload, then the capacity of that particular context (e.g., context 261) would increase. In so doing, the context controllers 230-250 should be configured to process/understand workload descriptions (i.e., understand how the addition/removal of a particular workload to a context impacts the capacity of the context). Tools capable of dynamically monitoring and determining the capacity of a particular context are known, and the context controllers 230-250 are not limited to any tool so capable.

In certain aspects, the context controllers 230-250 are also configured to initiate recovery/redeployment of workloads in a particular context. Additionally, the context controllers 230-250 can also be configured to trigger enqueuing of workloads in the particular context. Tools capable of performing these functions, and the context controllers 230-250 are not limited to any tool so capable. Additionally, the context controllers 230-250 are also configured to communicate with other resource controller nodes (e.g., 205-220) to, for example, receive instructions as to how workloads can be reallocated/restarted and/or provide information to be used by the other resource controller nodes to determine where workloads can be reallocated/restarted.

Each of the resource controller nodes 205-220 are configured to receive information on context capacity from child nodes that the each particular resource controller node is managing. For example, the Dallas data center resource controller node 230 can receive context capacity information from the Dallas contexts 261, 263. As another example, the North American resource controller node 210 can receive context capacity information from the Dallas data center resource controller node 230 and the Seattle data center resource controller node 240. In yet another example, the Global resource controller node 205 can receive context capacity information from the North America data center resource controller node 210 and the United Kingdom (UK) data center resource controller node 220.

Like the context controllers 230-250, the resource controller nodes 205-220 should be configured to process/understand workload descriptions (i.e., understand how the addition/removal of a particular workload to a context impacts the capacity of the context). Additionally, the resource controller nodes 205-220 should be configured to use the context capacity information received from the child nodes to determine one or more viable redeployment contexts for a given workload upon a determination that a failure within the original context for the workload has been detected. The determination of the viable redeployment contexts can include evaluating costs of redeployment as well as considering requirements/restrictions associated with a particular workload.

Based upon this determination, the resource controller nodes 205-220 are configured to assign/delegate a particular workload to be redeployed on a child leaf associated with the resource controller node, which includes providing workload reassignment/bursting assessment to the child node. Alternatively, the resource controller nodes 205-220 may also be configured to defer a workload reassignment decision to a parent node (if available). For example, the North American resource controller node 210 may determine that a workload reassignment decision cannot be made and will defer that decision to the Global resource controller node 205. In so doing, the North American resource control node 210 can provide workload reassignment/bursting assessment information (including context capacity information) to the parent node (i.e., the Global resource controller node 205).

Figure 3:
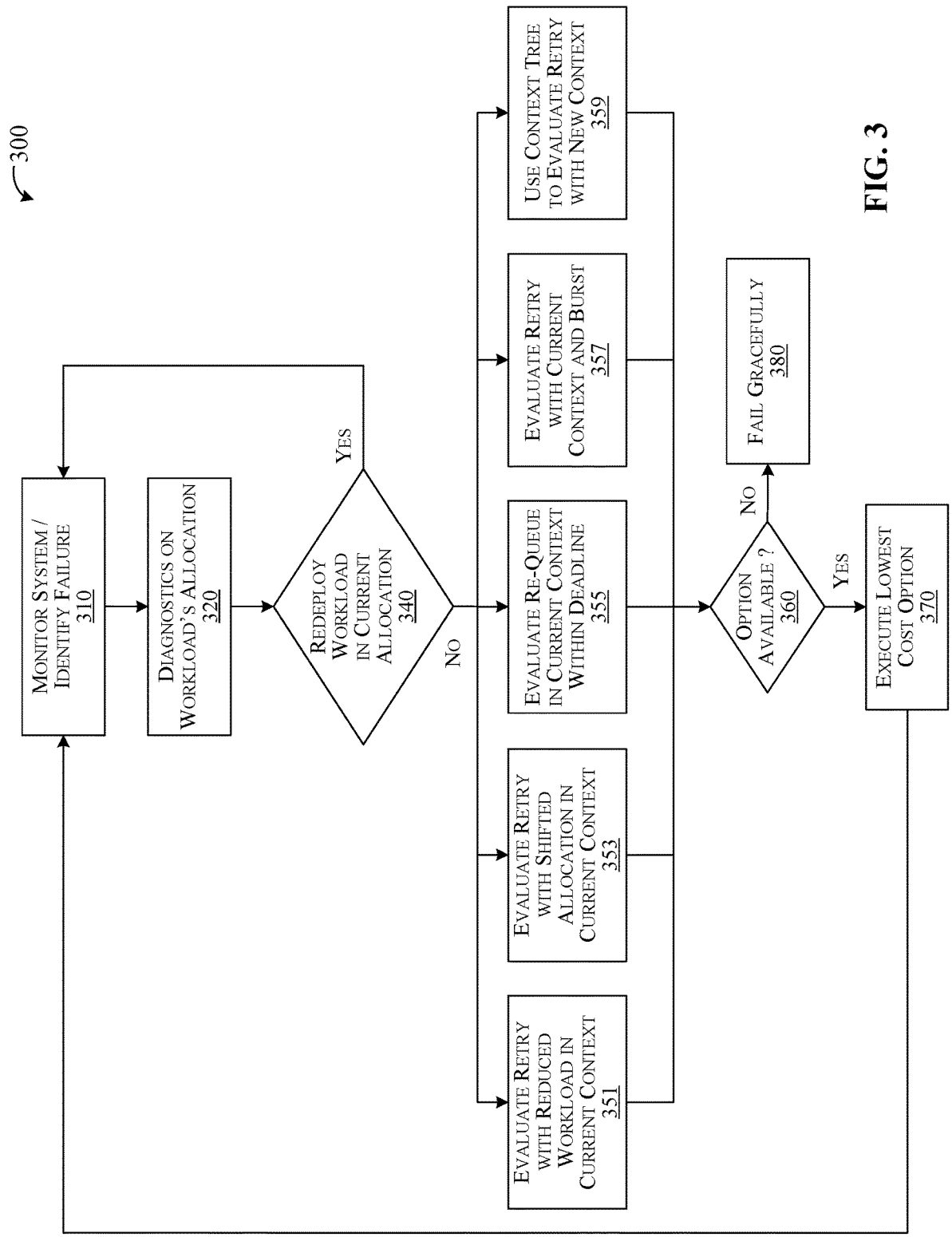
FIG. 3 is a block diagram illustrating a methodology of performing workload reassignment using the architecture of FIG. 1 according to an embodiment of the present invention.

With reference to FIG. 3, an overview of the general process 300 for employing the context controller 130 is disclosed. In 310, the context controller 130 monitors the current allocation for the workload to determine if a failure occurs in one of the nodes 162A-F/164A-F in the current allocation. Many different known approach for failure monitoring exist, and the present context controller 130 is not limited as to a particular approach so capable.

In 320, the context controller 130 collects diagnostics on the workload's current allocation. These diagnostics can include identifying the particular point(s) of failure (e.g., whether the failure is at the hardware, middleware, or software layer) as well as how much of the workload has been completed. The collecting of diagnostics can also include retrieving a policy 115 associated with the workload and/or data center 100.

In 330, a determination is made whether the current allocation is completely healthy or fully recovered. If so, the workload is capable of being redeployed in the current allocation in the current context. If not, in 351-359, evaluations are performed for 5 different recovery options (e.g., each of 351, 353, 355, 357, and 359 respectively corresponding to FIGS. 4A-B, 5A-B, 6A-B, 7A-B, and 8A-B) that are responsive to the failure.

In certain aspects, each evaluation includes two different subparts. The first subpart of the evaluation is to determine whether the particular recovery option can be performed, and the second subpart of the evaluation is to determine a particular "cost" associated with performing the particular recovery option. Regarding the first subpart, depending upon the policy 115 and, for example, the availability of resources in the contexts 261-281 being evaluated, one of more of the recovery options 351, 353, 355, 357, and 359 may not be available to be performed. If a particular recovery option is not available to be performed, the second evaluation can optionally not be performed for that particular recovery option. For example, a policy associated with the workload may indicate that the workload is to be confined to a particular data center/geographic region, which could impact the ability of some or all of the workload to be recovered at different secondary contexts.

The second subpart of the evaluation involves the context controller 130 and/or resource controller node 110 determining a cost for a particular recovery option. Many different approaches for determining a cost of migrating workload within/across contexts are known, and the context controller 130 and/or resource controller node 110 is not limited as to a particular approach so capable. In certain aspects, the cost of a particular recovery option may be a multivariate function that includes migration time, currency, data latency, data restrictions, among other factors. Depending upon the particular recovery option available, this second evaluation can generate multiple different costs as a particular recovery options can cover multiple different options. For example, if an evaluation is performed as to the costs of migrating the workload to a different secondary context and multiple different secondary contexts are available, then the cost can be evaluated for each of these multiple different secondary contexts. As will be discussed further below with regard to operation 360, the determined costs for each of the available recovery options 351-359 will be evaluated regarding one another.

Figure 4A:
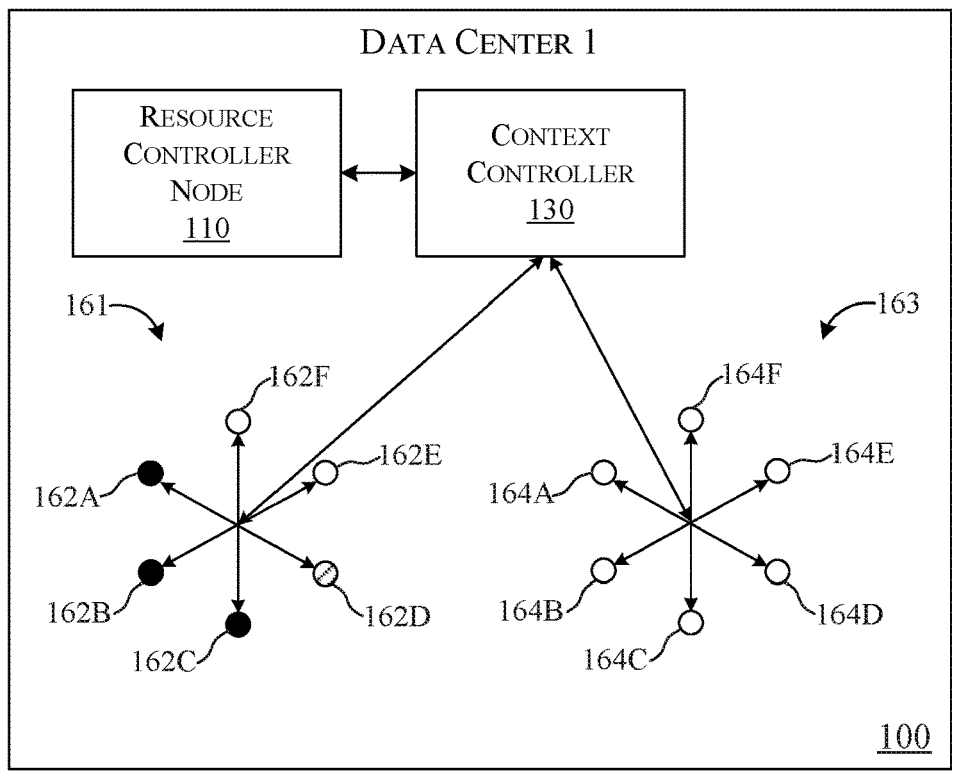
FIGS. 4A and 4B respectively illustrate the example architecture illustrated in FIG. 1 before and after reallocation of a workload after failure detection using a first recovery option according to an embodiment of the present invention.
Figure 4B:
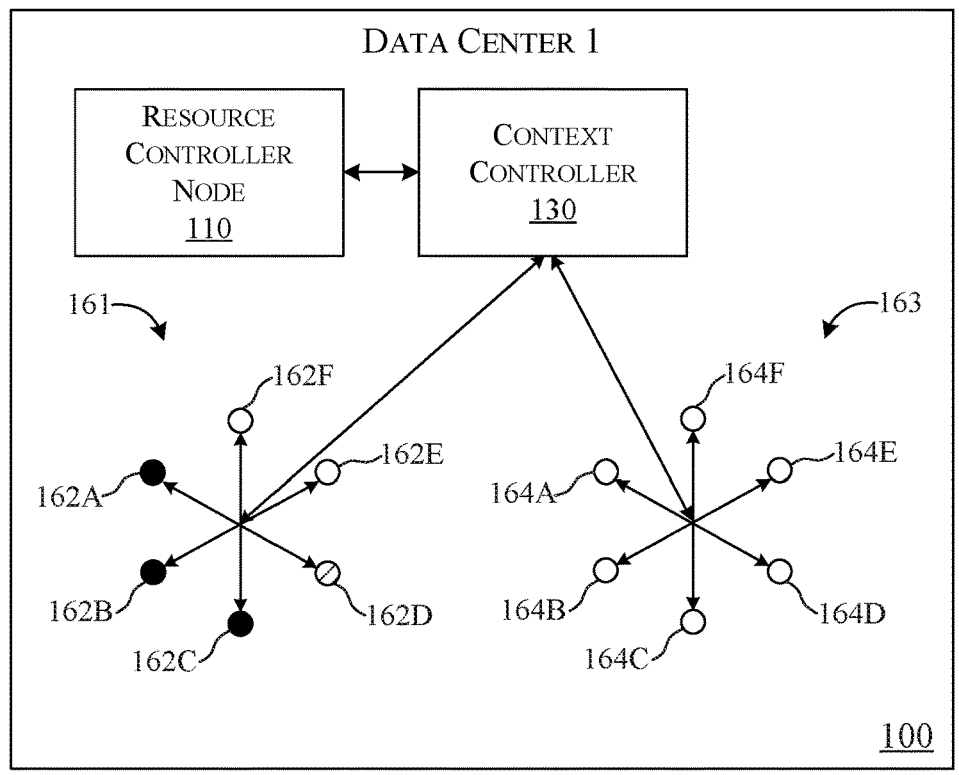

In 351 and with reference to FIGS. 4A-B, an option of shrinking the workload in the current content 161 is evaluated. For example, if compute nodes 162A-D in the current context 161 were originally assigned to the workload, a determination can be made whether the workload is shrinkable (e.g., only compute nodes 162A-C are assigned to the workload). If a determination is made that the workload is shrinkable in the current context 161, the cost of shrinking the workload is evaluated.

Figure 5A:
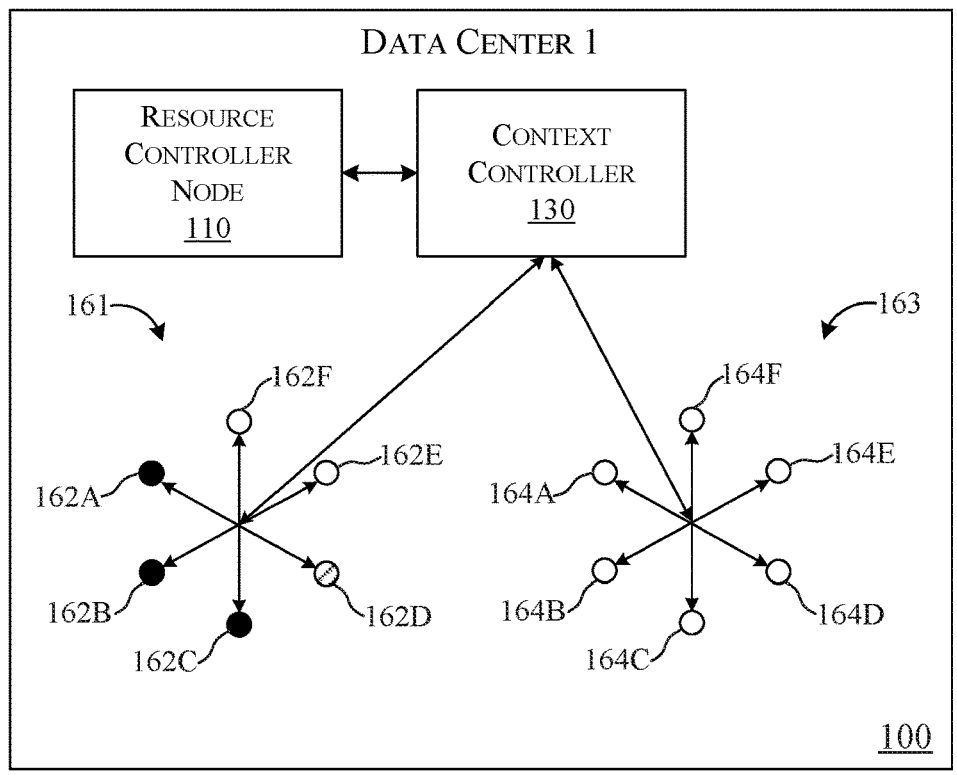
FIGS. 5A and 5B respectively illustrate the example architecture illustrated in FIG. 1 before and after reallocation of a workload after failure detection using a second recovery option according to an embodiment of the present invention.
Figure 5B:
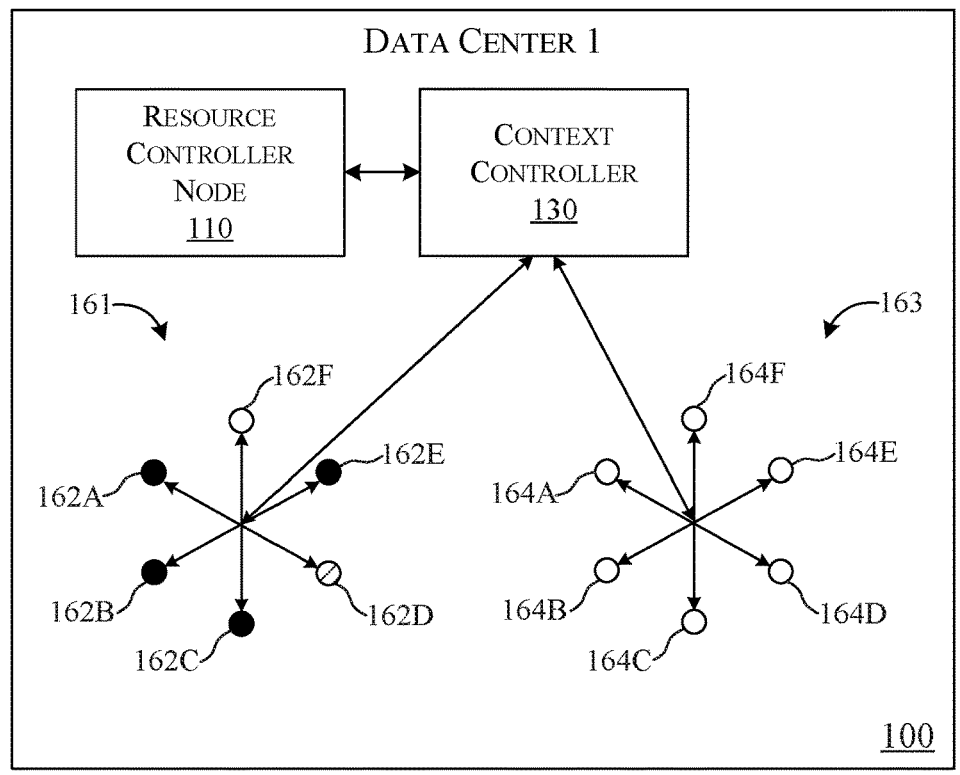

In 353 and with reference to FIGS. 5A-B, an option of shifting the current allocation to a new allocation within the current context 161 is evaluated. For example, if compute nodes 162A-D in the current context 161 were originally assigned to the workload, a determination can be made whether the workload can be shifted within the current context 161. The shifting of the current allocation can include adding one or more compute nodes (e.g., compute node 162E as illustrated in FIG. 5) to the current allocation within the context 161 or reallocating an entirely different set of compute nodes within the current context 161 (not illustrated) to the workload as a new current allocation. Consequently, the new allocation may or may not include compute nodes from the original allocation. If a determination is made that the workload is capable of being shifted in the current context 161, the cost of shifting the workload is evaluated.

Figure 6A:
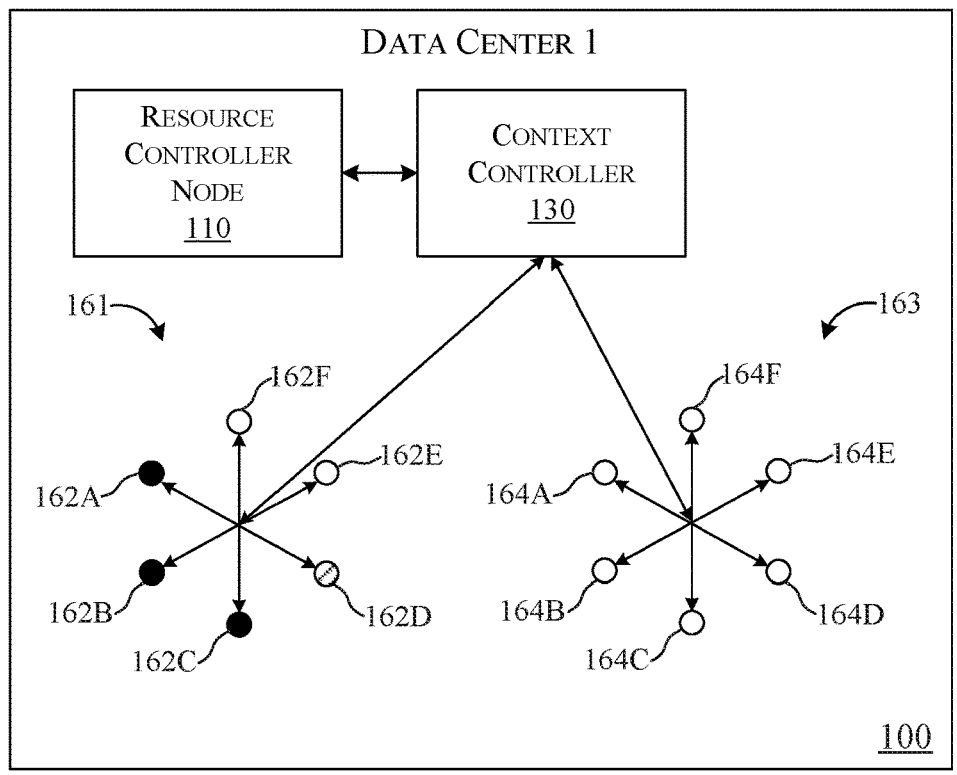
FIGS. 6A and 6B respectively illustrate the example architecture illustrated in FIG. 1 before and after reallocation of a workload after failure detection using a third recovery option according to an embodiment of the present invention.
Figure 6B:
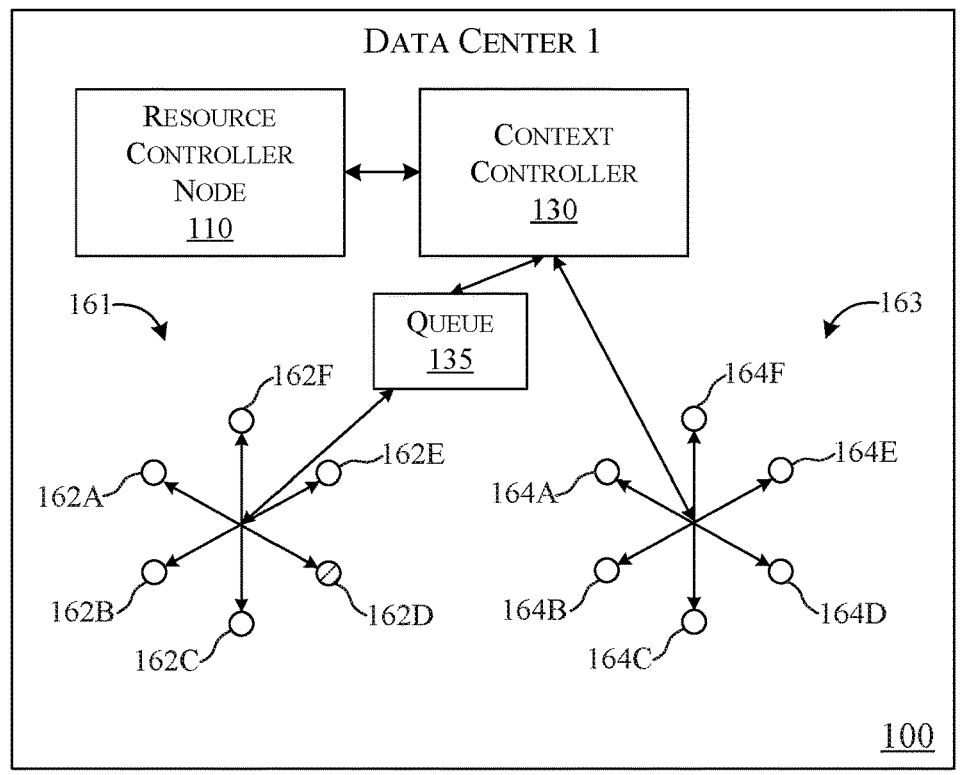

In 355 and with reference to FIGS. 6A-B, an option of performing the workload within the current context 161 and within the deadline is evaluated. As discussed above, the deadline is a statically- or dynamically-determined time threshold or cut-off for the workload to be performed. This evaluation can involving re-queueing the workload in a queue 135 for the current context 161 and determining whether sufficient compute nodes 162A-E in the current context 161 will eventually become available (e.g., because other workloads being performed by the context 161 have completed and/or the failed compute node 162D) and are sufficient to perform the workload within the deadline. If a determination is made that the workload is capable of being performed in the current context 161 within the deadline, the cost of waiting for the workload to be performed in the current context 161 is evaluated.

Figure 7A:
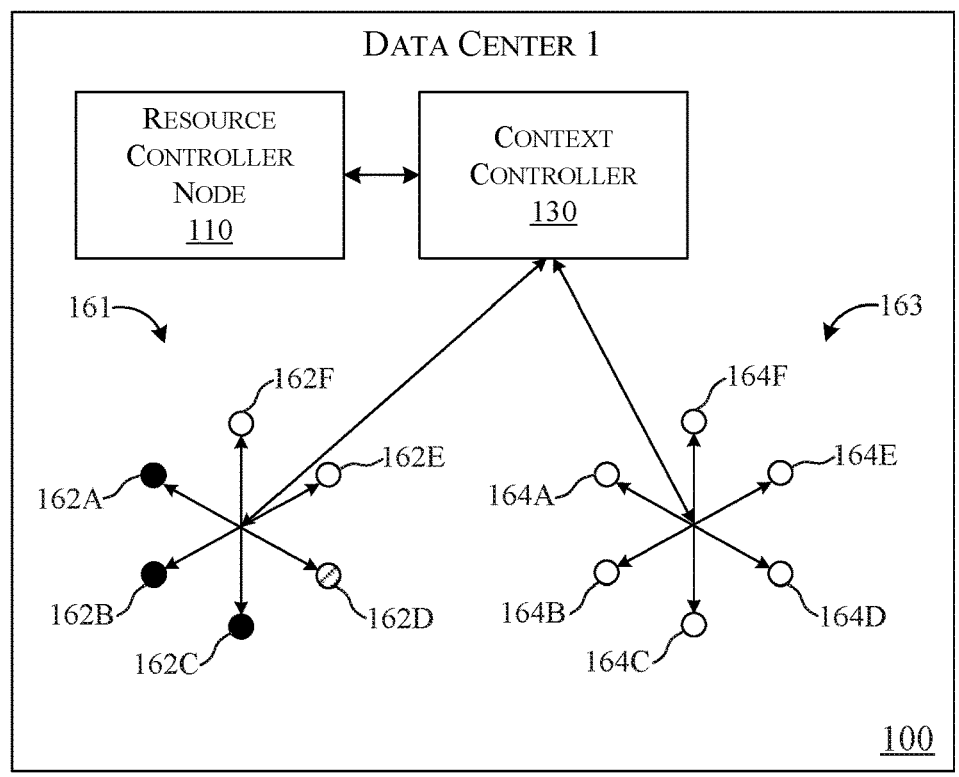
FIGS. 7A and 7B respectively illustrate the example architecture illustrated in FIG. 1 before and after reallocation of a workload after failure detection using a fourth recovery option according to an embodiment of the present invention.
Figure 7B:
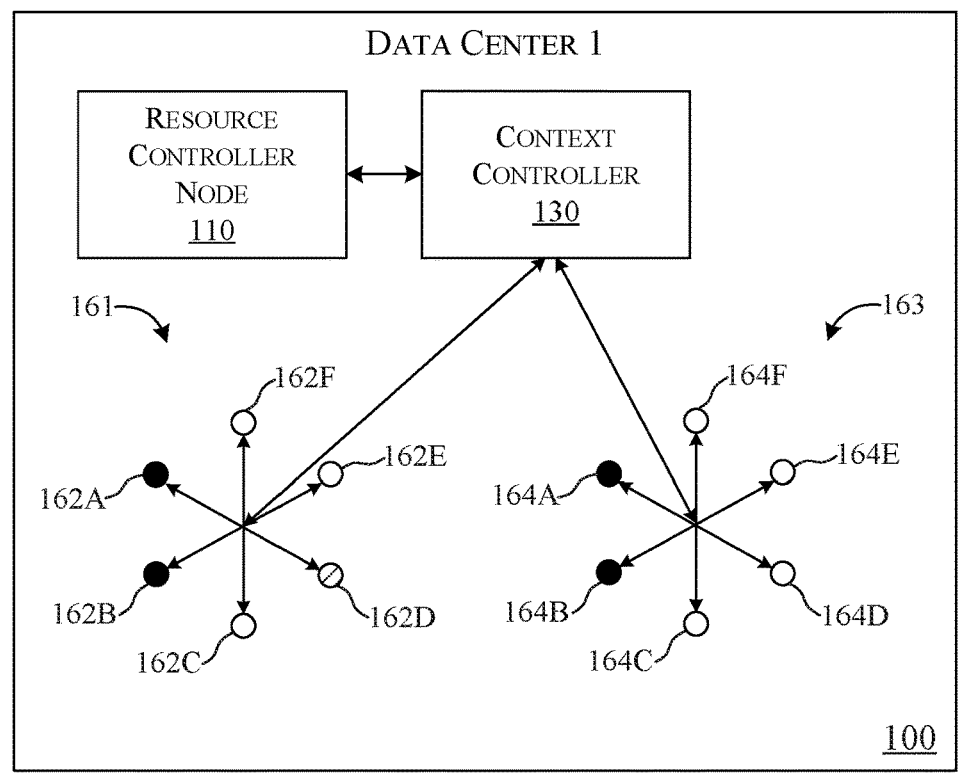

In 357 and with reference to FIGS. 7A-B, an option of bursting portion of the workload from the current context 161 to a new secondary context 163 evaluated. This evaluation first involves determining whether the workload is burstable—i.e., at least one portion of the workload is capable of being split off from the original workload and able to be performed in a different secondary context. For example, parallel processes are more capable of being burstable over processes that are performed in series. If the workload is burstable, a determination is then made as to whether the burstable portion(s) can be performed in a different secondary context. Although FIG. 7B illustrated that the different secondary context 163 is within the same data center 100, the different secondary context can be within a different data center. If a determination is made that portion(s) of the workload are burstable and another context is capable of performing the burstable portion(s), the cost of bursting the workload is evaluated.

Figure 8A:
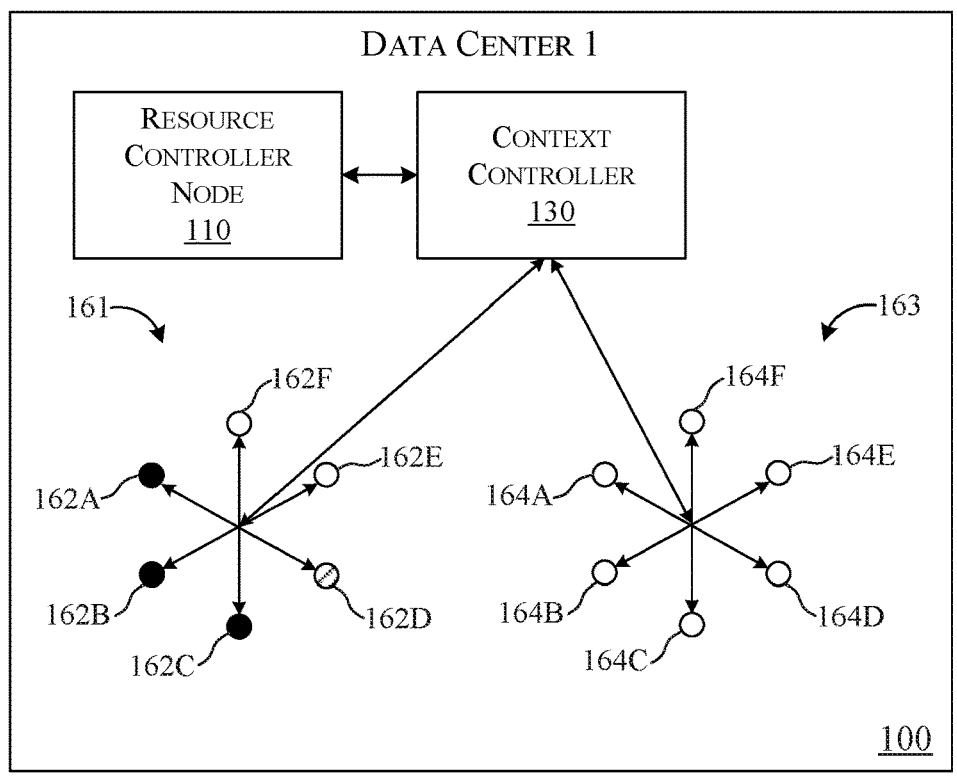
FIGS. 8A and 8B respectively illustrate the example architecture illustrated in FIG. 1 before and after reallocation of a workload after failure detection using a fifth recovery option according to an embodiment of the present invention.
Figure 8B:
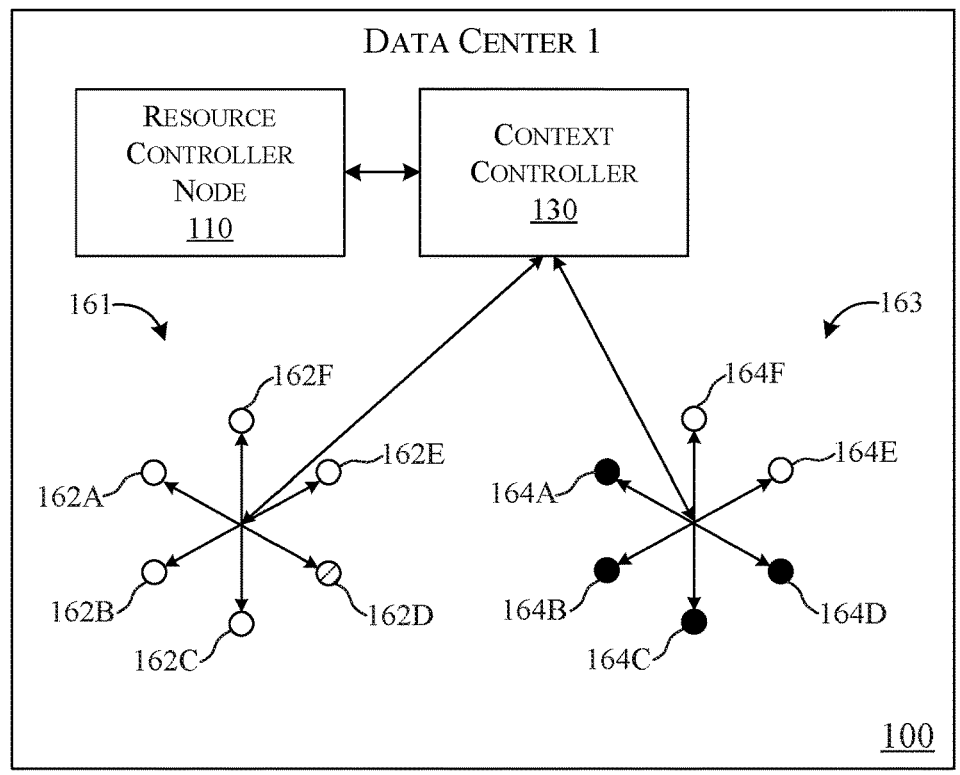

In 359 and with reference to FIGS. 8A-B, an option of migrating the workload from the current context 161 to a new secondary context 163 is evaluated. Option 359 is similar to option 357 except option 359 involves migrating the entire workload whereas option 357 contemplates bursting on a portion(s) of the workload to the new secondary context 163. This evaluation a determination as to whether the workload can be performed in a different secondary context. Although FIG. 7B illustrates that the different secondary context 163 is within the same data center 100, the different secondary context can be within a different data center. If a determination is made the workload is capable of being performed in another context, the cost of migrating the workload is evaluated.

In 360, a determination is made as to whether at least one of the options 351-359 is capable of being performed. If there is at least one option 351-359, then the context controller 130 and/or resource controller node 110 selects the option 351-359 having the lowest cost option.

In 370, the option 351-359 having the lowest cost option is caused to be executed by the context controller 130. However, if no option is available, the process 300 proceeds from operation 360 to operation 380, in which the workload is directed to fail gracefully. This can include, for example, reporting that the workload has failed and re-queueing the workload.

As defined herein, the term "responsive to" means responding or reacting readily to an action or event. Thus, if a second action is performed "responsive to" a first action, there is a causal relationship between an occurrence of the first action and an occurrence of the second action, and the term "responsive to" indicates such causal relationship.

As defined herein, the term "real time" means a level of processing responsiveness that a user or system senses as sufficiently immediate for a particular process or determination to be made, or that enables the processor to keep up with some external process.

As defined herein, the term "automatically" means without user intervention.

Figure 9:
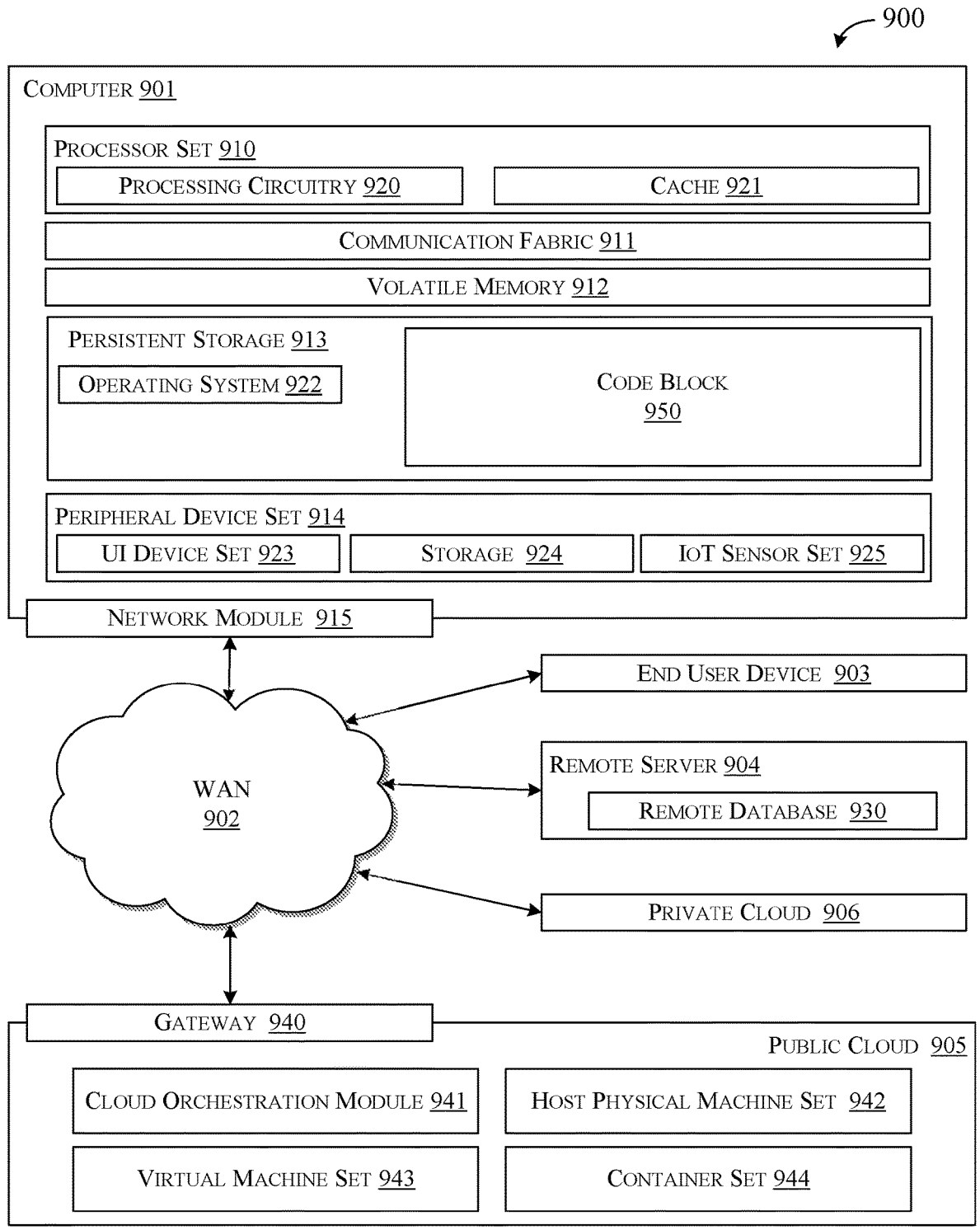
FIG. 9 is a block diagram illustrating an example of a computer environment for implementing portions of the methodology of FIG. 3.

Referring to FIG. 9, computing environment 900 contains an example of an environment for the execution of at least some of the computer code involved in performing the inventive methods, such as code block 950 for implementing the operations of the resource controller node 110 and context controller 130. Computing environment 900 includes, for example, computer 901, wide area network (WAN) 902, end user device (EUD) 903, remote server 904, public cloud 905, and private cloud 906. In certain aspects, computer 901 includes processor set 910 (including processing circuitry 920 and cache 921), communication fabric 911, volatile memory 912, persistent storage 913 (including operating system 922 and method code block 950), peripheral device set 914 (including user interface (UI), device set 923, storage 924, and Internet of Things (IoT) sensor set 925), and network module 915. Remote server 904 includes remote database 930. Public cloud 905 includes gateway 940, cloud orchestration module 941, host physical machine set 942, virtual machine set 943, and container set 944.

Computer 901 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 930. As is well understood in the art of computer technology, and depending upon the technology, performance of a computer-implemented method may be distributed among multiple computers and/or between multiple locations. However, to simplify this presentation of computing environment 900, detailed discussion is focused on a single computer, specifically computer 901. Computer 901 may or may not be located in a cloud, even though it is not shown in a cloud in FIG. 9 except to any extent as may be affirmatively indicated.

Processor set 910 includes one, or more, computer processors of any type now known or to be developed in the future. As defined herein, the term "processor" means at least one hardware circuit (e.g., an integrated circuit) configured to carry out instructions contained in program code. Examples of a processor include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller. Processing circuitry 920 may be distributed over multiple packages, for example, multiple, coordinated integrated circuit chips. Processing circuitry 920 may implement multiple processor threads and/or multiple processor cores. Cache 921 is memory that is located in the processor chip package(s) and is typically used for data or code that should be available for rapid access by the threads or cores running on processor set 910. Cache memories are typically organized into multiple levels depending upon relative proximity to the processing circuitry. Alternatively, some, or all, of the cache for the processor set may be located "off chip." In certain computing environments, processor set 910 may be designed for working with qubits and performing quantum computing.

Computer readable program instructions are typically loaded onto computer 901 to cause a series of operational steps to be performed by processor set 910 of computer 901 and thereby effect a computer-implemented method, such that the instructions thus executed will instantiate the methods specified in flowcharts and/or narrative descriptions of computer-implemented methods discussed above in this document (collectively referred to as "the inventive methods"). These computer readable program instructions are stored in various types of computer readable storage media, such as cache 921 and the other storage media discussed below. The program instructions, and associated data, are accessed by processor set 910 to control and direct performance of the inventive methods. In computing environment 900, at least some of the instructions for performing the inventive methods may be stored in code block 950 in persistent storage 913.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible, hardware device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Communication fabric 911 is the signal conduction paths that allow the various components of computer 901 to communicate with each other. Typically, this communication fabric 911 is made of switches and electrically conductive paths, such as the switches and electrically conductive paths that make up busses, bridges, physical input/output ports and the like. Other types of signal communication paths may be used for the communication fabric 911, such as fiber optic communication paths and/or wireless communication paths.

Volatile memory 912 is any type of volatile memory now known or to be developed in the future. Examples include dynamic type random access memory (RAM) or static type RAM. Typically, the volatile memory 912 is characterized by random access, but this is not required unless affirmatively indicated. In computer 901, the volatile memory 912 is located in a single package and is internal to computer 901. In addition to alternatively, the volatile memory 912 may be distributed over multiple packages and/or located externally with respect to computer 901.

Persistent storage 913 is any form of non-volatile storage for computers that is now known or to be developed in the future. The non-volatility of the persistent storage 913 means that the stored data is maintained regardless of whether power is being supplied to computer 901 and/or directly to persistent storage 913. Persistent storage 913 may be a read only memory (ROM), but typically at least a portion of the persistent storage 913 allows writing of data, deletion of data and re-writing of data. Some familiar forms of persistent storage 913 include magnetic disks and solid state storage devices. Operating system 922 may take several forms, such as various known proprietary operating systems or open source Portable Operating System Interface type operating systems that employ a kernel. The code included in code block 950 typically includes at least some of the computer code involved in performing the inventive methods.

Peripheral device set 914 includes the set of peripheral devices for computer 901. Data communication connections between the peripheral devices and the other components of computer 901 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet.

In various aspects, UI device set 923 may include components such as a display screen, speaker, microphone, wearable devices (such as goggles and smart watches), keyboard, mouse, printer, touchpad, game controllers, and haptic devices. Storage 924 is external storage, such as an external hard drive, or insertable storage, such as an SD card. Storage 924 may be persistent and/or volatile. In some aspects, storage 924 may take the form of a quantum computing storage device for storing data in the form of qubits. In aspects where computer 901 is required to have a large amount of storage (for example, where computer 901 locally stores and manages a large database) then this storage 924 may be provided by peripheral storage devices designed for storing very large amounts of data, such as a storage area network (SAN) that is shared by multiple, geographically distributed computers. Internet-of-Things (IoT) sensor set 925 is made up of sensors that can be used in IoT applications. For example, one sensor may be a thermometer and another sensor may be a motion detector.

Network module 915 is the collection of computer software, hardware, and firmware that allows computer 901 to communicate with other computers through a Wide Area Network (WAN) 902. Network module 915 may include hardware, such as modems or Wi-Fi signal transceivers, software for packetizing and/or de-packetizing data for communication network transmission, and/or web browser software for communicating data over the internet. In certain aspects, network control functions and network forwarding functions of network module 915 are performed on the same physical hardware device. In other aspects (for example, aspects that utilize software-defined networking (SDN)), the control functions and the forwarding functions of network module 915 are performed on physically separate devices, such that the control functions manage several different network hardware devices. Computer readable program instructions for performing the inventive methods can typically be downloaded to computer 901 from an external computer or external storage device through a network adapter card or network interface included in network module 915.

WAN 902 is any Wide Area Network (for example, the internet) capable of communicating computer data over non-local distances by any technology for communicating computer data, now known or to be developed in the future. In some aspects, the WAN 902 ay be replaced and/or supplemented by local area networks (LANs) designed to communicate data between devices located in a local area, such as a Wi-Fi network. The WAN 902 and/or LANs typically include computer hardware such as copper transmission cables, optical transmission fibers, wireless transmission, routers, firewalls, switches, gateway computers and edge servers.

End user device (EUD) 903 is any computer system that is used and controlled by an end user (for example, a customer of an enterprise that operates computer 901), and may take any of the forms discussed above in connection with computer 901. EUD 903 typically receives helpful and useful data from the operations of computer 901. For example, in a hypothetical case where computer 901 is designed to provide a recommendation to an end user, this recommendation would typically be communicated from network module 915 of computer 901 through WAN 902 to EUD 903. In this way, EUD 903 can display, or otherwise present, the recommendation to an end user. In certain aspects, EUD 903 may be a client device, such as thin client, heavy client, mainframe computer, desktop computer and so on.

As defined herein, the term "client device" means a data processing system that requests shared services from a server, and with which a user directly interacts. Examples of a client device include, but are not limited to, a workstation, a desktop computer, a computer terminal, a mobile computer, a laptop computer, a netbook computer, a tablet computer, a smart phone, a personal digital assistant, a smart watch, smart glasses, a gaming device, a set-top box, a smart television and the like. Network infrastructure, such as routers, firewalls, switches, access points and the like, are not client devices as the term "client device" is defined herein. As defined herein, the term "user" means a person (i.e., a human being).

Remote server 904 is any computer system that serves at least some data and/or functionality to computer 901. Remote server 904 may be controlled and used by the same entity that operates computer 901. Remote server 904 represents the machine(s) that collect and store helpful and useful data for use by other computers, such as computer 901. For example, in a hypothetical case where computer 901 is designed and programmed to provide a recommendation based on historical data, then this historical data may be provided to computer 901 from remote database 930 of remote server 904. As defined herein, the term "server" means a data processing system configured to share services with one or more other data processing systems.

Public cloud 905 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 905 is performed by the computer hardware and/or software of cloud orchestration module 941. The computing resources provided by public cloud 905 are typically implemented by virtual computing environments that run on various computers making up the computers of host physical machine set 942, which is the universe of physical computers in and/or available to public cloud 905. The virtual computing environments (VCEs) typically take the form of virtual machines from virtual machine set 943 and/or containers from container set 944. It is understood that these VCEs may be stored as images and may be transferred among and between the various physical machine hosts, either as images or after instantiation of the VCE. Cloud orchestration module 941 manages the transfer and storage of images, deploys new instantiations of VCEs and manages active instantiations of VCE deployments. Gateway 940 is the collection of computer software, hardware, and firmware that allows public cloud 905 to communicate through WAN 902.

VCEs can be stored as "images," and a new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 906 is similar to public cloud 905, except that the computing resources are only available for use by a single enterprise. While private cloud 906 is depicted as being in communication with WAN 902, in other aspects, a private cloud 906 may be disconnected from the internet entirely (e.g., WAN 902) and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this aspect, public cloud 905 and private cloud 906 are both part of a larger hybrid cloud.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

As another example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. Each block in the flowchart or block diagrams may represent a module, segment, or portion of instructions, which comprises one or more executable instructions for implementing the specified logical function(s).

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "includes," "including," "comprises," and/or "comprising," when used in this disclosure, specify the presence of stated features, integers, steps, operations, elements, and/or components, but do not preclude the presence or addition of one or more other features, integers, steps, operations, elements, components, and/or groups thereof.

Reference throughout this disclosure to "one embodiment," "an embodiment," "one arrangement," "an arrangement," "one aspect," "an aspect," or similar language means that a particular feature, structure, or characteristic described in connection with the embodiment is included in at least one embodiment described within this disclosure. Thus, appearances of the phrases "one embodiment," "an embodiment," "one arrangement," "an arrangement," "one aspect," "an aspect," and similar language throughout this disclosure may, but do not necessarily, all refer to the same embodiment.

The term "plurality," as used herein, is defined as two or more than two. The term "another," as used herein, is defined as at least a second or more. The term "coupled," as used herein, is defined as connected, whether directly without any intervening elements or indirectly with one or more intervening elements, unless otherwise indicated. Two elements also can be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, etc. may be used herein to describe various elements, these elements should not be limited by these terms, as these terms are only used to distinguish one element from another unless stated otherwise or the context indicates otherwise.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context. As used herein, the terms "if," "when," "upon," "in response to," and the like are not to be construed as indicating a particular operation is optional. Rather, use of these terms indicate that a particular operation is conditional. For example and by way of a hypothetical, the language of "performing operation A upon B" does not indicate that operation A is optional. Rather, this language indicates that operation A is conditioned upon B occurring.

The foregoing description is just an example of embodiments of the invention, and variations and substitutions. While the disclosure concludes with claims defining novel features, it is believed that the various features described herein will be better understood from a consideration of the description in conjunction with the drawings. The process(es), machine(s), manufacture(s) and any variations thereof described within this disclosure are provided for purposes of illustration. Any specific structural and functional details described are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

What is claimed is:

1. A method, within and by a computer hardware system including a context controller, of managing recovery for a workload within a cloud environment, comprising:
   initially allocating to the workload a plurality of compute nodes, as a current allocation, within a context of the cloud environment;
   identifying a failure within the current allocation;
   evaluating, responsive to the failure being identified, a plurality of costs respectively associated with each of a plurality of recovery options for the workload; and
   causing a lowest-cost option, from the plurality of recovery options being evaluated, to be executed, wherein
   the recovery options being evaluated includes both:
      recovery options that include performing the workload within the current context, and
      recovery options that include performing at least a portion of the workload in at least one secondary context of the cloud environment, and
   the evaluating the recovery options that include performing the at least the portion of the workload in the at least one secondary context includes communicating with a resource controller node associated with the context controller to identify the at least one secondary context.

2. The method of claim 1, wherein
   the recovery options being evaluated include a recovery option that shrinks the workload to be performed in the current context.

3. The method of claim 1, wherein
   the recovery options being evaluated include a recovery option that shifts the current allocation to a new allocation in the current context.

4. The method of claim 1, wherein
   the recovery options being evaluated include a recovery option that re-queues the workload in the current context within a deadline.

5. The method of claim 1, wherein
   the recovery options being evaluated include a recovery option that performs a portion of the workload in the current context and bursts a different portion of the workload into the at least one secondary context.

6. The method of claim 1 wherein
   the recovery options being evaluated include a recovery option that reassigns the workload to the at least one secondary context.

7. The method of claim 1, wherein
   the recovery options being evaluated include:
      a recovery option that shrinks the workload to be performed in the current context,
      a recovery option that shifts the current allocation to a new allocation in the current context,
      a recovery option that re-queues the workload in the current context within a deadline,
      a recovery option that performs a portion of the workload in the current context and bursts a different portion of the workload into the at least one secondary context, and
      a recovery option that reassigns the workload to the at least one secondary context.

8. The method of claim 1, wherein
   for each of the recovery options a determination is first made whether the recovery option is capable of being performed, and
   for a particular recovery options determined to be incapable of being performed, an evaluation of a cost for performing that particular option is not performed.

9. The method of claim 1, wherein
   the context controller is configured to:
      determine capacities, respectively, for each of a plurality of contexts being managed by the context controller, and
      provide the capacities to the resource controller node.

10. A computer hardware system including a context controller is configured to manage recovery for a workload within a cloud environment, comprising:
    a hardware processor configured to initiate the following executable operations:
       initially allocating to the workload a plurality of compute nodes, as a current allocation, within a context of the cloud environment;
       identifying a failure within the current allocation;
       evaluating, responsive to the failure being identified, a plurality of costs respectively associated with each of a plurality of recovery options for the workload; and
       causing a lowest-cost option, from the plurality of recovery options being evaluated, to be executed, wherein
    the recovery options being evaluated includes both:
       recovery options that include performing the workload within the current context, and
       recovery options that include performing at least a portion of the workload in at least one secondary context of the cloud environment, and
    the evaluating the recovery options that include performing the at least the portion of the workload in the at least one secondary context includes communicating with a resource controller node associated with the context controller to identify the at least one secondary context.

11. The system of claim 10, wherein
    the recovery options being evaluated include a recovery option that shrinks the workload to be performed in the current context.

12. The system of claim 10, wherein
    the recovery options being evaluated include a recovery option that shifts the current allocation to a new allocation in the current context.

13. The system of claim 10, wherein
    the recovery options being evaluated include a recovery option that re-queues the workload in the current context within a deadline.

14. The system of claim 10, wherein
    the recovery options being evaluated include a recovery option that performs a portion of the workload in the current context and bursts a different portion of the workload into the at least one secondary context.

15. The system of claim 10 wherein
    the recovery options being evaluated include a recovery option that reassigns the workload to the at least one secondary context.

16. The system of claim 10, wherein
    the recovery options being evaluated include:
       a recovery option that shrinks the workload to be performed in the current context,
       a recovery option that shifts the current allocation to a new allocation in the current context,
       a recovery option that re-queues the workload in the current context within a deadline, a recovery option that performs a portion of the workload in the current context and bursts a different portion of the workload into the at least one secondary context, and a recovery option that reassigns the workload to the at least one secondary context.

17. The system of claim 10, wherein for each of the recovery options a determination is first made whether the recovery option is capable of being performed, and for a particular recovery options determined to be incapable of being performed, an evaluation of a cost for performing that particular option is not performed.

18. The system of claim 10, wherein the context controller is configured to:

determine capacities, respectively, for each of a plurality of contexts being managed by the context controller, and provide the capacities to the resource controller node.

19. A computer program product, comprising:

a computer readable storage medium having stored therein program code for managing recovery for a workload within a cloud environment, the program code, which when executed by a computer hardware system including a context controller, causes the computer hardware system to perform:

initially allocating to the workload a plurality of compute nodes, as a current allocation, within a context of the cloud environment;

identifying a failure within the current allocation;

evaluating, responsive to the failure being identified, a plurality of costs respectively associated with each of a plurality of recovery options for the workload; and causing a lowest-cost option, from the plurality of recovery options being evaluated, to be executed, wherein the recovery options being evaluated includes both:

recovery options that include performing the workload within the current context, and recovery options that include performing at least a portion of the workload in at least one secondary context of the cloud environment, and the evaluating the recovery options that include performing the at least the portion of the workload in the at least one secondary context includes communicating with a resource controller node associated with the context controller to identify the at least one secondary context.

20. The computer program product of claim 19, wherein the recovery options being evaluated include:

a recovery option that shrinks the workload to be performed in the current context, a recovery option that shifts the current allocation to a new allocation in the current context, a recovery option that re-queues the workload in the current context within a deadline, a recovery option that performs a portion of the workload in the current context and bursts a different portion of the workload into the at least one secondary context, and a recovery option that reassigns the workload to the at least one secondary context.

* * * * *